United States Patent [19]

Decouzon et al.

[11] 4,341,396
[45] Jul. 27, 1982

[54] FRONT AXLE ASSEMBLY FOR AUTOMOBILE

[75] Inventors: M. Georges Decouzon, Guyancourt; M. Jean J. Carduner, Sannois, both of France

[73] Assignee: Regie Nationale des Usines Renault, Boulogne-Billancourt, France

[21] Appl. No.: 94,094

[22] Filed: Nov. 14, 1979.

[30] Foreign Application Priority Data

Nov. 14, 1978 [FR] France ............................ 78 32071

[51] Int. Cl.³ ................................................ B60G 3/06
[52] U.S. Cl. .................................... 280/666; 280/675
[58] Field of Search .............. 280/666, 667, 668, 96.3, 280/663, 664

[56] References Cited

U.S. PATENT DOCUMENTS

| | | | |
|---|---|---|---|
| 2,153,271 | 4/1939 | Paton | 280/666 X |
| 2,737,398 | 3/1956 | Mohr | 280/666 |
| 3,492,018 | 1/1970 | Burckhardt | 280/96.3 |
| 4,159,125 | 6/1979 | Buchwald | 280/667 |

FOREIGN PATENT DOCUMENTS

| | | |
|---|---|---|
| 1559262 | 3/1929 | France . |
| 1096938 | 6/1955 | France . |
| 1597358 | 7/1970 | France . |
| 306761 | 3/1929 | United Kingdom . |

*Primary Examiner*—Joseph F. Peters, Jr.
*Assistant Examiner*—Ross Weaver
*Attorney, Agent, or Firm*—Oblon, Fisher, Spivak, McClelland & Maier

[57] ABSTRACT

A front steering axle assembly of an automobile includes a modified McPherson strut which provides a low pivot angle and a negative offset to the ground. The strut is connected to the axle rack by a pair of legs which are articulated to upper and lower extensions of the axle rack. The lower leg is also articulated to a transverse arm which pivots about a horizontal axis extending longitudinally to the body of the automobile. The point of articulation between the lower leg and the lower extension of the axle rack is compact and located closely adjacent the vertical median plane of the wheel.

4 Claims, 6 Drawing Figures

FRONT AXLE ASSEMBLY FOR AUTOMOBILE

BACKGROUND OF THE INVENTION

1. Field of the Invention

This invention relates to a front steering axle, either drive or nondrive, having a low pivot angle and a negative offset to ground.

2. Description of the Prior Art

Classic front axles of the true or pseudo "Mac Pherson" type are characterized generally by the need to have either a large pivot angle in order to obtain a negative offset to ground (i.e., point of contact of pivot axis with the ground lying outside the median plane of the wheel) or a moderate pivot angle requiring a positive offset to ground.

It will be recalled that the pivot axis is an imaginary line passing, on the one hand, through the upper articulation of the strut to the body and, on the other, through the lower suspension ball-joint.

The great incline of the pivot axis alluded to above entails a high offset of wheel to stub axle. This notion can be visualized as the distance on the transverse axis passing through the stub axle between the intersection of this axis with the wheel plane and with the pivot axis.

A number of drawbacks flow from the preceding, such as that:

steering stiffness, and thus the stiffness of the connection leading to the steering wheel, are great and that, the caster angle of such an axle varies during wide wheel-clearance and such variations are not negligeable, which had a bad influence on the reactions of the axle.

An axle assembly composed of two suspension triangles enables certain improvements to the preceding assembly to be obtained such as that:

the offset to ground may be made negative; and that the ease of steering may be increased, since the carrying element does not move.

However, this type of assembly still presents the disadvantages of a relatively great pivot angle, to which are added the need to situate and affix the upper arm, which interferes with the engine compartment.

SUMMARY OF THE INVENTION

The purpose of the instant invention is a perfected front axle which mitigates the above disadvantages by altering the position of the pivot axis with regard to the wheel plane and thus reducing steering stiffness.

One advantageous consequence of this arrangement is to reduce tire-to-road friction during turning by virtue of the slight negative offset of the wheel to the ground and to obtain a well known self-stabilizing effect during asymmetrical braking.

Another advantage resides in reduction of the gravitational return of the steering as a result of reducing the pivot angle.

Another advantage lies in reduction of the rotational torque of the wheel about the pivot axis, resulting (as will be seen) from the replacement of ball-joints by friction-free swivel joints.

Still another advantage flows from reduction of the mass in movement during turning, since rotation of the shock absorber during turning is eliminated.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
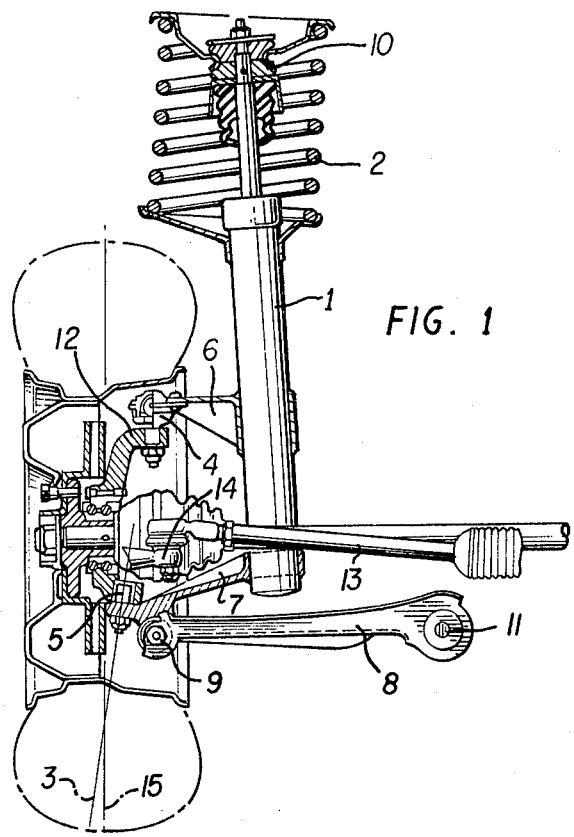
FIG. 1 is a cross-sectional view along a vertical and transverse plane passing through the stub axle of half an assembly according to the invention.
Figure 2:
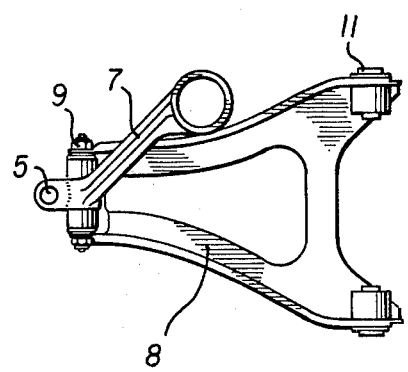
FIG. 2 is a top view of the articulation of the shock absorber to the lower arm.

With reference to FIG. 1, it will be seen that the assembly comprises a telescoping strut 1 constituted by a shock absorber, articulated at its upper portion to the body by flexible articulation 10 and at its lower portion to a triangular arm 8, better seen in FIG. 2, by means of an elastic articulation movable about a horizontal axis.

The suspension function is assured by a helicoidal spring 2 pressing against the body and by a cup affixed to strut 1, but it may also be assured by a torsion bar locked onto axle 11 which unifies lower arm 8 with the body.

Connection of the wheel to the half-axle is performed using two legs 6 and 7 rigidly affixed to the body of the shock absorber serving as strut 1.

Figure 6:
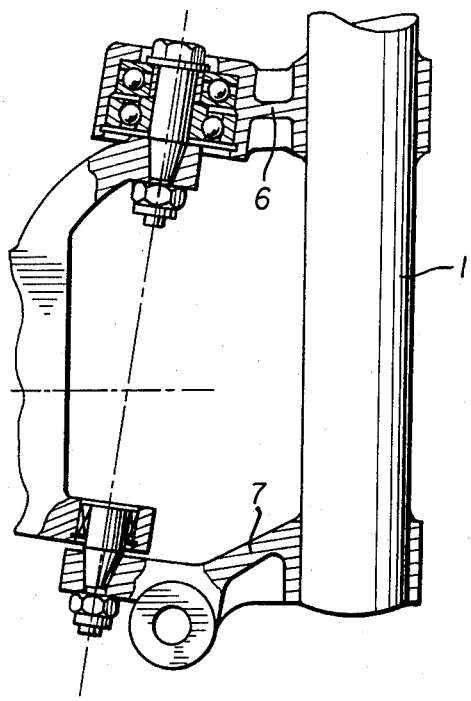
FIG. 6 is a variant of the pivot axis support.
Figure 3:
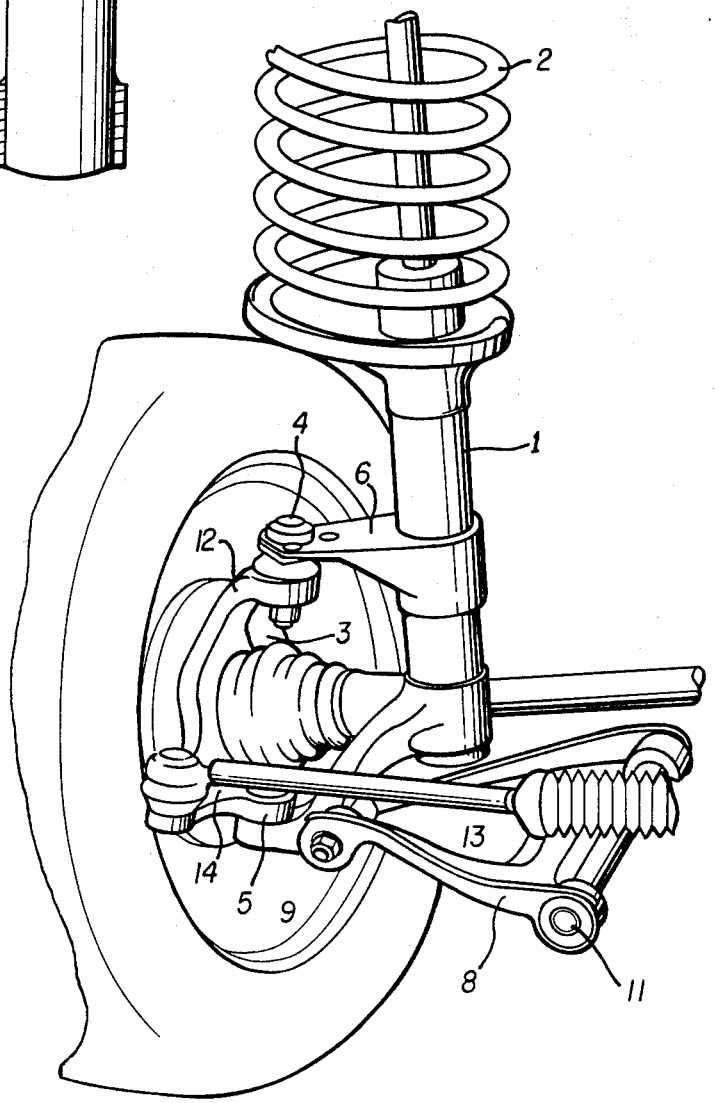
FIG. 3 is a perspective view of the half-assembly of FIG. 1.

Upper leg 6 at its free end receives articulation 4 which supports the load and which may either be represented by a ball-joint, or by a ball thrust bearing and a ball bearing (see FIG. 6) or by a needle thrust bearing and a needle roller bearing.

Lower leg 7 at its free end has articulation 5, which may be either a needle roller bearing or a ball bearing.

Leg 7 further has articulation 9 at the same end, movable about an essentially horizontal axis which holds lower transverse arm 8 and prevents shock absorber 1 from rotating.

Stub axle rack 12 is articulated at its upper and lower extensions respectively to earlier described elements 4 and 5. In addition, it receives steering rod 13 at its lever 14.

It can thus be seen that pivot axis 3, which passes through articulations 4 and 5, is independent of articulation 10 of the strut to the body.

Figure 5:
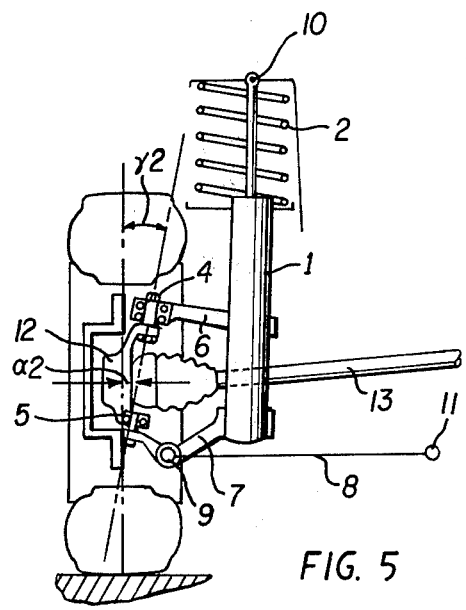

Because of the small space required by articulation 5 in comparison to ball-joints (as previously used), said pivot axis 3 may be located quite close to the wheel axle. This then enables the obtaining (despite small pivot angle γ2) of a negative offset d2 to ground and a small offset to stub axle d2 (see FIG. 5), entailing the advantages described above.

Figure 4:
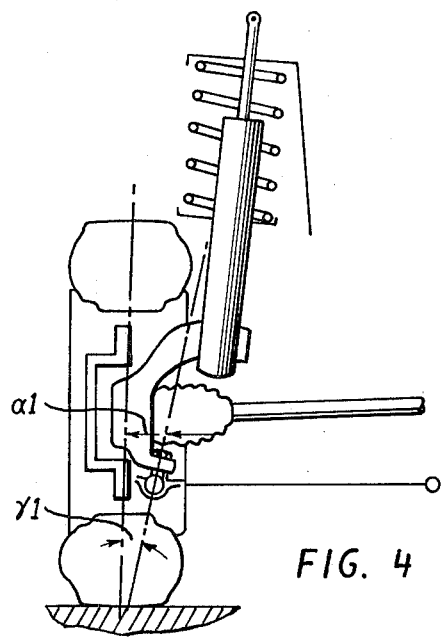
FIGS. 4 and 5 are two comparative front-view diagrams of half a Mac Pherson assembly and half an assembly according to the invention.

By contrast, if one refers to FIG. 4 relating to a classic Mac Pherson suspension, one sees that pivot angle γ1 is indeed greater than that which characterizes the suspension of the invention. The same is true for offset to stub axle d1.

It will be noted further that, according the invention, rotation of the shock absorber during turning is eliminated, along with the entire friction mechanism which enables it to turn with respect to the spring and the body.

This then enables economy, weight gain, and lightness of steering.

In addition, since shock absorber 1 must of necessity be located in a plane perpendicular to axis 11 of lower arm 8 there is no caster angle variation.

Obviously, numerous modifications and variations of the present invention are possible in light of the above teachings. It is therefore to be understood that within the scope of the appended claims, the invention may be practiced otherwise than as specifically described herein.

We claim:

1. In an automobile having a wheel, including a vertical median plane, an axle, a steering rod and a body, a front axle assembly comprising:

an axle rack in which said axle is positioned, said axle rack including an upper extension and a lower extension, said upper and lower extensions extending away from said median plane, said steering rod being articulated to said lower extension;

a transverse arm articulated to said body about a horizontal axis extending parallel to the length of said body;

a telescoping strut disposed between said axle rack and said body;

an upper leg rigidly fixed at one end to said strut and articulated at the other end to said upper extension of said axle rack via a first swivel joint having a first swivel axis; and a lower leg rigidly fixed at one end to said strut, articulated at said other end to said lower extension of said axle rack, via a second swivel joint having a second swivel axis substantially coaxial with said first swivel axis, and articulated at a midpoint thereof about a horizontal axis to said transverse arm, whereby said axle rack may be displaced relative to said transverse arm wherein said wheel is supported on said axle, and a line passing through the point of articulation of said upper extension and said upper leg and passing through the point of articulation of said lower extension and said lower leg, meets the ground on the side of said vertical median plane of the wheel which is opposite the side on which said assembly is located, whereby a negative offset is provided for said assembly;

whereby a self-stabilizing effect during asymmetrical braking is achieved and road friction during turning is reduced.

2. The axle assembly of claim 1 wherein said point of articulation of said lower extension and said lower leg is comprised by a compact joint located closely adjacent said vertical median plane.

3. The axle assembly of claims 1 or 2 wherein said point of articulation of said lower extension and said lower leg is comprised by a joint including needle roller bearings.

4. The axle assembly of claims 1 or 2 wherein said point of articulation of said lower extension and said lower leg is comprised by a joint including ball bearings.

* * * * *